United States Patent [19]

Tanaka et al.

[11] 4,048,650
[45] Sept. 13, 1977

[54] STILL COLOR TELEVISION SIGNAL RECORDING AND REPRODUCING APPARATUS

[75] Inventors: Yoshinori Tanaka, Yokohama; Hajime Shinoda, Tokyo; Hisaaki Narahara, Musashino, all of Japan

[73] Assignee: Sony Corporation, Tokyo, Japan

[21] Appl. No.: 692,317

[22] Filed: June 3, 1976

[30] Foreign Application Priority Data

June 12, 1975  Japan .................................. 50-71204

[51] Int. Cl.$^2$ ......................... H04N 9/16; H04N 5/76
[52] U.S. Cl. ......................................... 358/1; 358/4
[58] Field of Search ................. 358/4, 1; 178/6.6 FS; 360/10

[56] References Cited

U.S. PATENT DOCUMENTS 3,812,522  5/1974  Izura et al. .......................... 358/4 X Primary Examiner—Howard W. Britton
Assistant Examiner—Mitchell Saffian
Attorney, Agent, or Firm—Lewis H. Eslinger; Alvin Sinderbrand

[57] ABSTRACT

There is disclosed a still color television signal recording and reproducing apparatus which utilizes a single storage tube of a conventional type. Circuitry is shown which enables to store one field or frame of a color television signal together with a color burst signal in a single storage tube. Then, the stored signal is read out from the storage tube and supplied to a color television monitor which includes a color cathode ray tube in order to reproduce a still color picture thereon.

5 Claims, 7 Drawing Figures

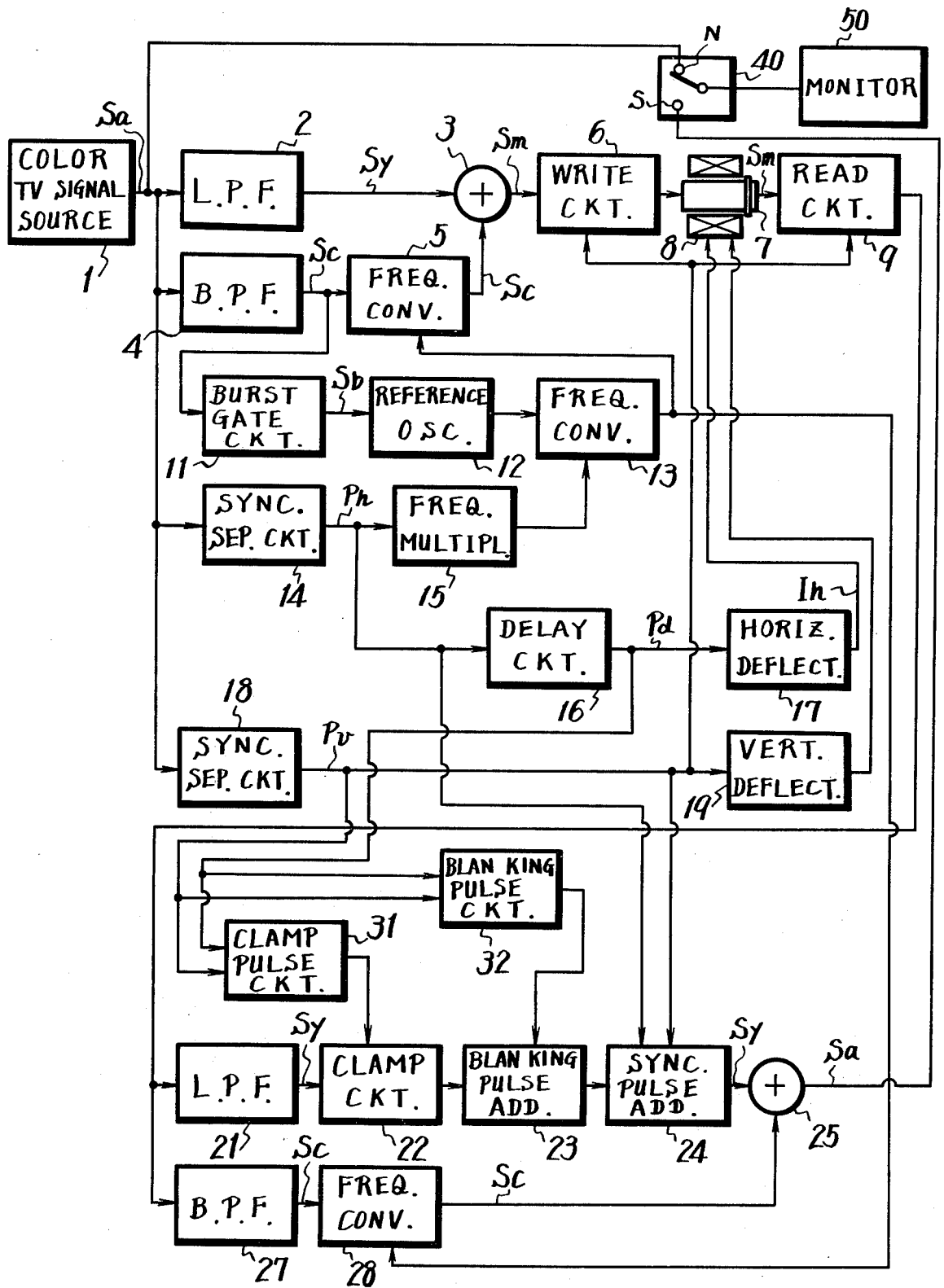

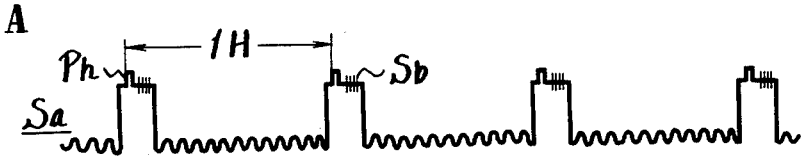
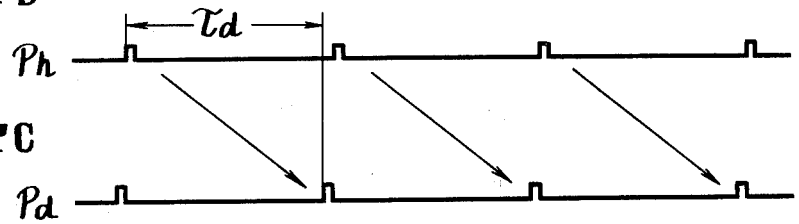
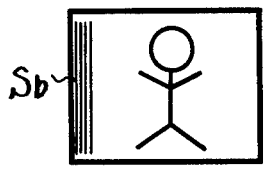
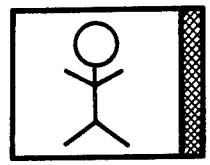

STILL COLOR TELEVISION SIGNAL RECORDING AND REPRODUCING APPARATUS

BACKGROUND OF THE INVENTION

1. Field of the Invention

This invention relates generally to a still color television signal recording and reproducing apparatus, and more particularly to such an apparatus which utilizes a single storage tube of a conventional type.

2. Description of the Prior Art

It is well known in the prior art that a certain selected field or frame of a television signal is stored in a storage tube and the stored video signal is read out from the storage tube afterwards. In such a case the selected frame of the television signal is stored on a target of the storage tube utilizing electron beams which are deflected onto the target by horizontal and vertical deflection signals which have blanking periods respectively. Then, no signals can be stored in or read out from the storage tube during the blanking periods.

Such blanking periods are not worth consideration for a rotary magnetic sheet which is also well known in the prior art as a signal storing element for a certain selected field or frame of a televison signal, because the selected signal is recorded along a circular or spiral track thereof without and blanking periods.

In case of a monochrome television signal recording and reproduction utilizing a storage tube, such blanking periods are little worth consideration, because little signal informations are included therein.

However, in case of a color television signal recording and reproduction utilizing a single storage tube, such blanking periods should be considered first of all, because color burst signals are contained in every horizontal blanking period.

One may happen to think of an idea to shorten horizontal blanking periods so that color burst signals can be stored in the storage tube, but such a shortage of horizontal blanking periods causes several problems for circuit design and makes deflection circuits for the storage tube expensive, because conventional deflection circuits such as used in a vidicon camera tube cannot be used and new special circuits should be designed.

OBJECTS AND SUMMARY OF THE INVENTION

Therefore, it is an object of the present invention to provide an improved still color television signal recording and reproducing apparatus utilizing a single storage tube.

Another object of the invention is to provide a specific still color television signal recording and reproducing apparatus in which a single storage tube is employed and a certain selected field or frame of a color television signal is stored in and read out from the storage tube together with its color burst component.

A further object of the invention is to provide an improved still color television signal recording and reproducing apparatus in which a single storage tube is employed and a specific deflection method for the storage tube is employed.

According to the present invention, the phase of a horizontal deflection signal for a storage tube is delayed by a period little shorter than one horizontal scanning period as compared with an input color video signal which is supplied to the storage tube for being stored or recorded therein. As the phase of the horizontal deflection signal is delayed by a period mentioned above, the phase thereof becomes substantially advanced by an appropriate period as compared with the input color video signal so that the color burst signal can be recorded at the beginning of every horizontal scanning period on the target of the storage tube.

This invention may be better understood, however, when the following detailed description is read in connection with the accompanying drawings.

BRIEF DESCRIPTION OF THE DRAWINGS

FIG. 1 is a block diagram of an embodiment of the still color television signal recording and reproducing apparatus according to the present invention, and FIGS. 2A-2F, inclusive, are waveform diagrams respectively to be used for explaining the operation of the still color television signal recording and reproducing apparatus of the invention shown in FIG. 1.

DESCRIPTION OF THE PREFERRED EMBODIMENT

An example of the present invention will be hereinafter described with reference to the drawings.

In FIG. 1 which shows an example of the invention, 1 designates a color television signal source. The color television signal source 1 is, for example, an input stage of a color television receiver which includes an antenna, a tuner, an IF amplifier, a video detector, etc.

From the signal source 1, there is derived a composite color video signal $Sa$ which is shown in FIG. 2A. The signal $Sa$ is an ordinary color television signal which contains a burst signal $Sb$ and a horizontal synchronizing signal $Ph$ shown in FIG. 2A.

The color video signal $Sa$ from the signal source 1 is supplied through a switching circuit 40 (a contact N thereof) to a monitor receiver 50 and then a color picture is reproduced by the color cathode ray tube (not shown) of the receiver 50. The monitor receiver 50 is, for example, the output stage of a color television receiver which includes a luminance channel, a chrominance channel, horizontal and vertical deflection circuits, etc., and which is well known, so that its detailed description will be omitted for the sake of brevity.

The still color television signal recording and reproducing by the apparatus shown in FIG. 1 will be now described in detail.

The color video signal $Sa$ from the signal source 1 is supplied to a low pass filter 2 which passes therethrough a luminance signal $Sy$. The luminance signal $Sy$ is supplied to an adder circuit 3. The color video signal $Sa$ from the signal source 1 is fed also to a band pass filter 4 which passes therethrough a chrominance signal $Sc$ and supplies the signal $Sc$ to a frequency converter 5. The chrominance signal $Sc$ from the band pass filter 4 is supplied also to a burst gate circuit 11 from which the burst signal $Sb$ is derived. The burst signal $Sb$ is fed to a reference oscillator circuit 12 of the injection type. Then, the reference oscillator circuit 12 produces a continuous wave signal in synchronism with the burst signal $Sb$. The continuous wave signal is then fed to a frequency converter circuit 13. The color video signal $Sa$ from the signal source 1 is supplied further to a synchronous separator circuit 14 which then produces a horizontal synchronizing pulse $Ph$ shown in FIG. 2B. The pulse $Ph$ is supplied to a frequency multiplier circuit 15 which then produces an oscillation signal whose frequency $f_c$ is $n \cdot f_h$ ($f_c = n \cdot f_h$) where $n$ is a positive integer and $f_h$ a horizontal frequency (for example, $f_c \approx 3.5$ MHz). The oscillation signal is supplied to the frequency converter 13 whose output signal is then supplied to the reference converter 5. Thus, the carrier frequency of the chrominance signal $S_C$ from the band pass filter 4 is frequency-modulated as $f_c$.

The reason why the carrier frequency of the chrominance signal $S_C$ is converted to $n \cdot f_h$ is well known in the art but will be described briefly. The carrier frequency of the chrominance signal $S_C$ from the band pass filter 4 is $(n + 1/2)f_h$ in, for example, NTSC system and hence is off multiples of one-half line-scanning frequency. If such a chrominance signal is stored directly in a storage tube, the signal level upon reading out is substantially zero. Accordingly, it is necessary that the carrier frequency of the chrominance signal is frequency-converted to be one which is even multiples of one-half line-scanning frequency.

The chrominance signal $S_C$, which is frequency-converted by the frequency converter 5, is supplied to the adder circuit 3 in which the chrominance signal $S_C$ is added to the luminance signal $Sy$ and which then produces a modified color composite video signal $Sm$. This modified color video signal $Sm$ is supplied to a WRITE circuit 6 of a storage tube 7.

The horizontal synchronizing pulse $Ph$ from the sync. separator circuit 14 is also fed to a delay circuit 16 which produces a delayed pulse $Pd$ by a period $\tau_d$ little shorter than one horizontal period as shown in FIG. 2C. The delayed pulse $Pd$ is supplied to a horizontal deflection circuit 17 which produces a horizontal deflection current $Ih$ is synchoronism with the delayed pulse $Pd$ as shown in FIG. 2D in which $Eh$ shown by dotted lines represents a horizontal deflection voltage. This horizontal deflection current $Ih$ is fed to a deflection coil asembly 8 of the storage tube 7.

The color video signal $Sa$ from the signal source 1 is further supplied to a sync. separator circuit 18 from which a vertical synchronizing signal $Pv$ is derived. This vertical synchronizing signal $Pv$ is fed to a vertical deflection circuit 19 which produces a vertical deflection current. The vertical deflection current is fed to the deflection coil assembly 8. The vertical synchronizing pulse $Pv$ is fed to the WRITE circuit 6 and also to a READ circuit 9 which is connected to the storage tube 7. This storage tube 7 is one of the conventional type which has the WRITE, READ and ERASE modes. Such a conventional storage tube is described, for example, in papers published in the IEEE Transactions on Electron Devices, vol. AD-18, No. 4, April 1971, "Electronic Image Storage Utilizing a Silicon Dioxide Target," by R. S. Silver and E. Luedicke, pp 229 to 235.

When the storage tube 7 is in the WRITE mode, the WRITE circuit 6 is made operative by a WRITE switch (not shown). Thus, the electrodes (not shown) of the storage tube 7 are respectively supplied with voltages of the WRITE mode in synchronism with the vertical synchronizing pulse $Pv$ from the sync. separator circuit 18, hence a certain selected field or frame of the modified color video signal $Sm$ is extracted, and then fed to the storage tube 7.

The biasing circuit for the electrodes of the storage tube 7 upon the WRITE mode is well known in the art, so that its description will be omitted.

The electron beams in the storage tube 7 are deflected by the deflection currents supplied from the deflection circuits 17 and 19 to the deflection coil assembly 8 to scan the target of the storage tube 7 and to store the modified color video signal $Sm$ in the selected frame on the target of the storage tube 7. In this case, as shown in FIGS. 2A to 2D, the horizontal deflection current $Ih$ is provided in accordance with the delayed pulse $Pd$, so that if the delayed time period $\tau_d$ of the delayed pulse $Pd$ is previously selected suitably, the rising edge of the horizontal deflection currrent $Ih$ can be selected at a time a little before the burst signal $Sb$. Thus, the horizontal scanning is started a little before the burst signal $Sb$ and hence, as shown in FIG. 2E, an electric charge pattern by the modified color video signal $Sm$ is formed on the target of the storage tube 7 and also the burst signal $Sb$ is stored as an electric charge pattern on the edge portion at the horizontal scanning starting side of the electric charge pattern of the signal $Sm$.

At the READ mode of the storage tube 7, the READ circuit 9 is made operative by a READ switch (not shown), and the electrodes (not shown) of the storage tube 7 are supplied with voltages of the READ mode, respectively, in synchronism with the vertical synchronizing pulse $Pv$ from the sync. separator circuit 18. The biasing circuit for the electrodes of the storage tube 7 upon the READ mode is well known in the art, so that its description will be omitted. Thus, the beams in the storage tube 7 are deflected by the deflection current $Ih$ from the deflection circuit 17, and the modified color video signal $Sm$ of one frame stored in the storage tube 7 is reproduced repeatedly, namely a still color video signal is reproduced, which is then derived through the READ circuit 9. The modified color video signal $Sm$ read out as a still color video signal is fed from the READ circuit 9 to a low pass filter 21 from which a luminance signal $Sy$ is derived. This luminance signal $Sy$ is fed to a clamp circuit 22. The delayed pulse $Pd$ from the delay circuit 16 and the vertical synchronizing pulse $Pv$ from the sync. separator circuit 18 are fed to a clamp pulse forming circuit 31 which then produces a clamp pulse. This clamp pulse is fed to the clamp circuit 22, so that the luminance signal $Sy$ supplied to the clamp circuit 22 from the low pass filter 21 is clamped such that the pedestal level of the luminance signal $Sy$ becomes constant.

The luminance signal $Sy$, whose pedestal level is made constant, is supplied to a blanking pulse adder circuit 23. The delayed pulse $Pd$ from the delay circuit 16 and the vertical synchronizing pulse $Pv$ from the sync. separator circuit 18 are fed to a blanking pulse forming circuit 32, which then produces a blanking pulse. This blanking pulse is fed to the blanking pulse adder circuit 23 which adds the blanking pulse to the luminance signal $Sy$. This luminance signal $Sy$ from the blanking pulse adder circuit 23 is fed to a synchronising pulse adder circuit 24 which is also supplied with the horizontal synchronizing pulse $Ph$ and the vertical synchronizing pulse $Pv$ from the sync. separator circuits 14 and 18. Thus, the luminance signal $Sy$ is added with the horizontal synchronizing pulse $Ph$ and the vertical synchronizing pulse $Pv$ and then fed to an adder circuit 25.

The modified color video signal $Sm$ from the READ circuit 9 is fed also to a band pass filter 27 from which the chrominance signal $S_C$ is derived. This chrominance signal $S_C$ is fed to a frequency converter 28 which is also supplied with the output signal from the converter 13. Thus, the chrominance signal $S_C$ from the band pass filter 27 is frequency-converted by the converter 28 from the carrier frequency $f_c$ to the original value, that is, the chrominance signal $S_C$ with the original frequency is obtained from the converter 28. The chrominance signal $S_C$ with the original frequency is supplied to the adder circuit 25 from which a still color video signal Sa is obtained which consists of the chrominance signal $S_C$ and the luminance signal $S_Y$. The still color television Sa from the adder circuit 25 is fed to a contact S of the switch circuit 40.

During the reproduction of a still color television signal, the monitor receiver 50 is supplied with the signal fed to the contact S of the switch circuit 40 or the still color video signal Sa from the adder 25 and reproduces a still color picture thereon.

The reproduced still color picture on the monitor receiver 50 is such a picture whose right side portion is broken off as shown in FIG. 2F, which is caused by the fact that the burst signal Sb is stored at the beginning portion of each horizontal scanning of the storage tube 7. The lack of such picture proposes substantially no problem in practical use.

As described above, with the still color television signal recording and reproducing apparatus of the present invention, the phase of the horizontal deflection current Ih fed to the storage tube 7 for the color video signal Sa is advanced as shown in FIGS. 2A to 2D, so that the burst signal Sb can be stored in and read out from the storage tube 7, as shown in FIG. 2E. Further, in addition to the burst signal Sb the pedestal portion of the video signal can be stored in and read out from the storage tube 7, so that upon reproducing the pedestal portion of the video signal is clamped by the clamp circuit 22. Thus, the DC restoration of the video signal can be performed positively.

Having described an illustrative embodiment of the invention, it will be apparent that many modifications and variations could be effected therein by one skilled in the art without departing from the spirits and scope of the novel concepts of the present invention as defined in the appended claims.

We claim as our invention

1. A still color television signal recording and reproducing apparatus comprising:
   a. a color television signal source;
   b. a storage tube having horizontal and vertical deflection means;
   c. WRITE circuit means connected to said signal source for applying a field of a color television signal to said storage tube when operated;
   d. READ circuit means connected to said storage tube for reading out a color video signal from the latter when operated;
   e. a color picture reproducing means connected to said READ circuit means for receiving said read out color video signal and for reproducing a still color picture therein;
   f. a horizontal deflection circuit connected to said signal source for supplying a horizontal deflection signal to the horizontal deflection means of said storage tube; and
   g. a vertical deflection circuit connected to said signal source for supplying a vertical deflection signal to the vertical deflection means of said storage tube;
   wherein said horizontal deflection circuit includes a delay circuit and the dalay time thereof is selected such that the horizontal scanning period of said storage tube begins at latest at the color burst signal portion of said color television signal from said WRITE circuit means when operated and said color burst signal portion is recorded in said storage tube at the beginning of every horizontal scanning period.

2. A still color television signal recording and reproducing apparatus according to claim 1 further comprises:
   an adder connected between said READ circuit means and said color picture reproducing means; and
   means connected between said adder and said horizontal and vertical deflection circuits for supplying horizontal and vertical synchronizing signals to said adder so that said synchronizing signals are added to said color video signal from said READ circuit means.

3. A still color television signal recording and reproducing apparatus according to claim 2 wherein said horizontal synchronizing signal supplied to said adder is derived from the input side of the delay circuit included in said horizontal deflection circuit.

4. A still color television signal recording and reproducing apparatus according to claim 3 further comprising:
   a clamp circuit connected between said READ circuit means and said color picture reproducing means for clamping the pedestal level of said read out color video signal.

5. A still color television signal recording and reproducing apparatus comporising:
   a. a color television signal source;
   b. a first low pass filter connected to said signal source for filtering out a luminance component from said color television signal;
   c. a first band pass filter connected to said signal source for filtering out a chrominance component from said color television signal;
   d. a first frequency converter connected to said band pass filter;
   e. a first adder connected between said first low pass filter and said first frequency converter for deriving a modified color video signal;
   f. a storage tube having horizontal and vertical deflection means;
   g. WRITE circuit means connected to said first adder for applying a field of the modified color video signal to said storage tube when operated;
   h. a horizontal deflection circuit connected to said signal source for supplying a horizontal deflection signal to the horizontal deflection means of said storage tube;
   i. a vertical deflection circuit connected to said signal source for supplying a vertical deflection signal to the vertical deflection means of said storage tube;
   j. READ circuit means connected to said storage tube for reading out a color video signal from the latter when operated;
   k. a second low pass filter connected to said READ circuit means for filtering out a luminance component from said read out color video signal;
   l. a second band pass filter connected to said READ circuit means for filtering out a chrominance component from said read out color video signal;
   m. a second frequency converter connected to said second band pass filter;
   n. a second adder connected to said low pass and band pass filters and further to said horizontal and vertical deflection circuits for deriving a still color television signal; and
   o. a color picture reproducing means connected to said second adder for receiving said still color television signal and for reproducing a still color picture therein;

wherein said horizontal deflection circuit includes a delay circuit, the delay time thereof is selected such that the horizontal scanning period of said storage tube begins at latest at the color burst signal portion of said modified color video signal when said WRITE circuit means is made operative, said color burst portion is stored in the storage tube at the beginning of every horizontal scanning period, and said color burst portion is read out from said storage tube when said READ circuit means is made operative.

* * * * *